Aug. 29, 1939.                E. W. BEEKMAN ET AL                 2,171,262
                           TRIMMING AND REAMING MACHINE
                    Filed Jan. 21, 1938          4 Sheets-Sheet 3
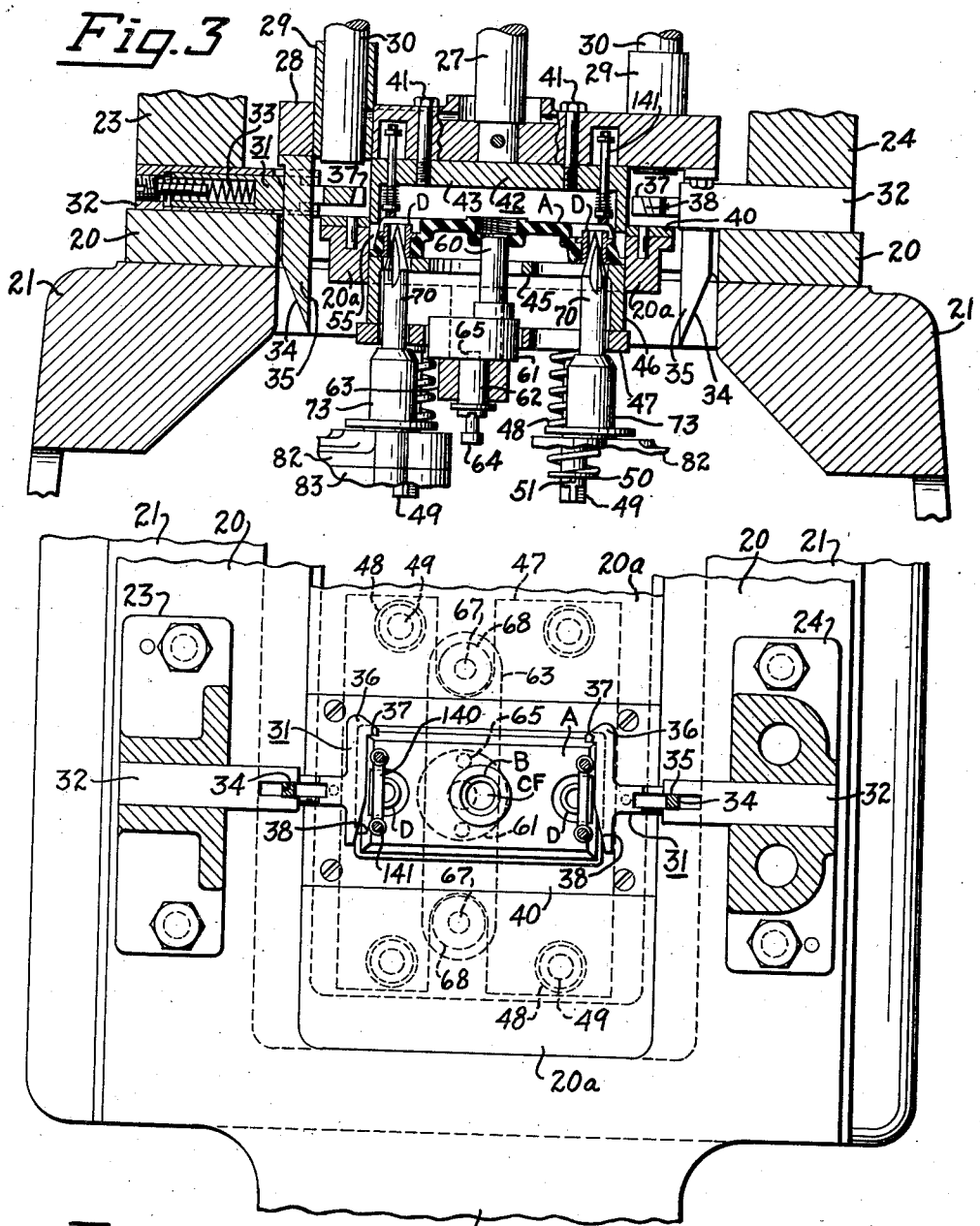
INVENTORS
EVERETT W BEEKMAN
RICHARD HAUBURSIN
EDGAR E WARD
THEIR ATTORNEYS Aug. 29, 1939.  E. W. BEEKMAN ET AL  2,171,262
TRIMMING AND REAMING MACHINE
Filed Jan. 21, 1938   4 Sheets-Sheet 4
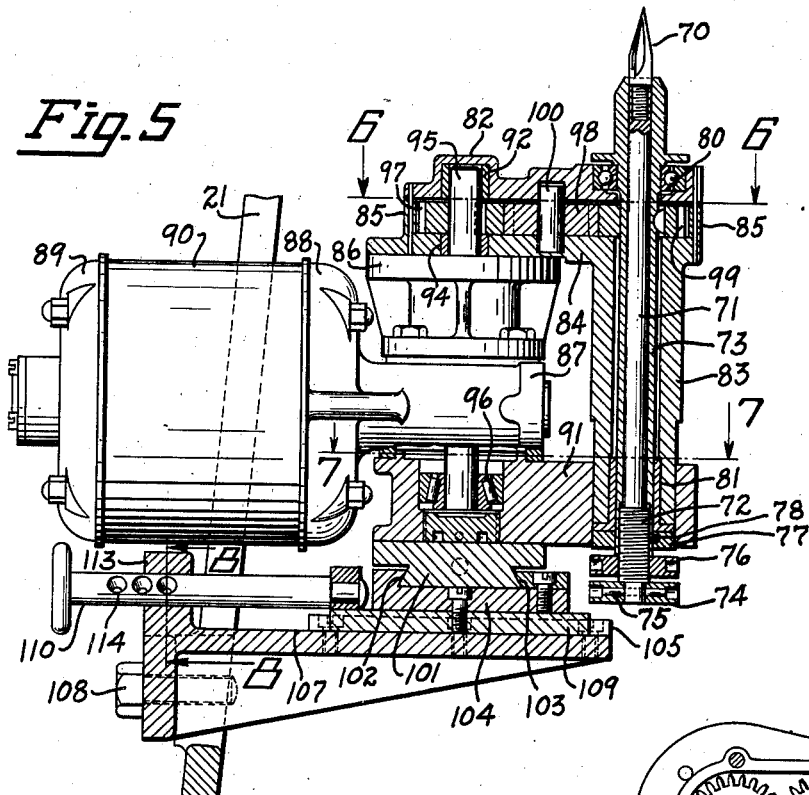
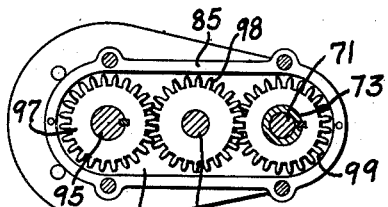
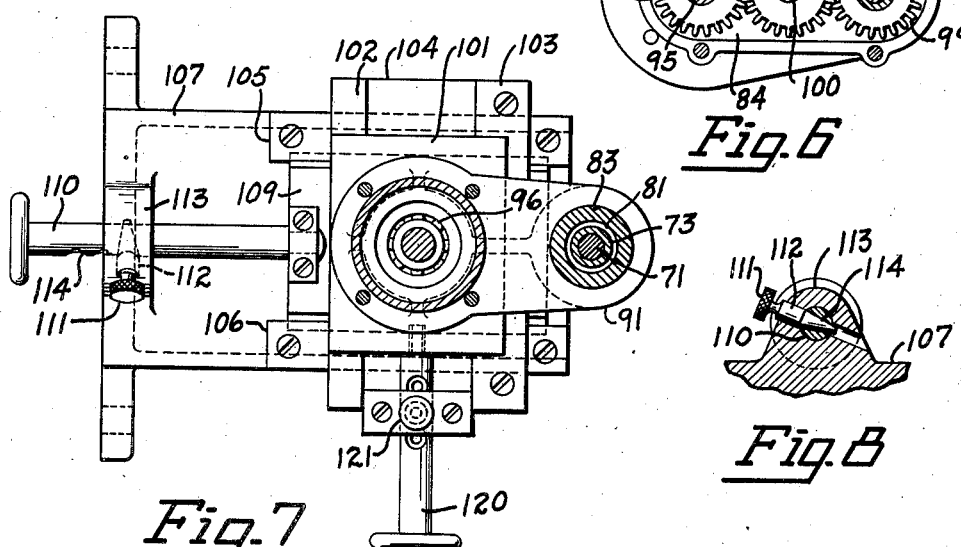
INVENTORS
EVERETT W BEEKMAN
RICHARD HAUBURSIN
EDGAR E WARD
THEIR ATTORNEYS Patented Aug. 29, 1939

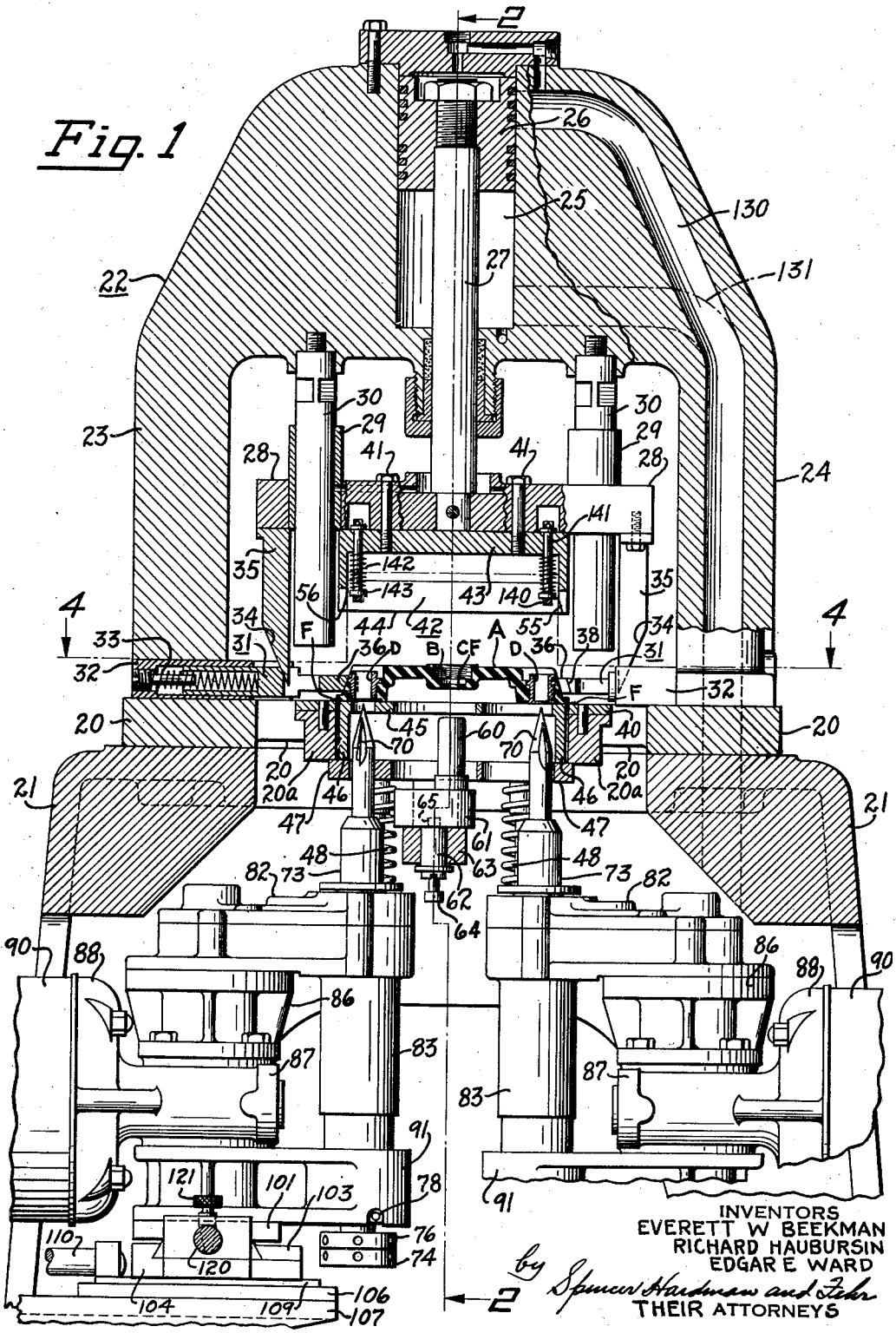

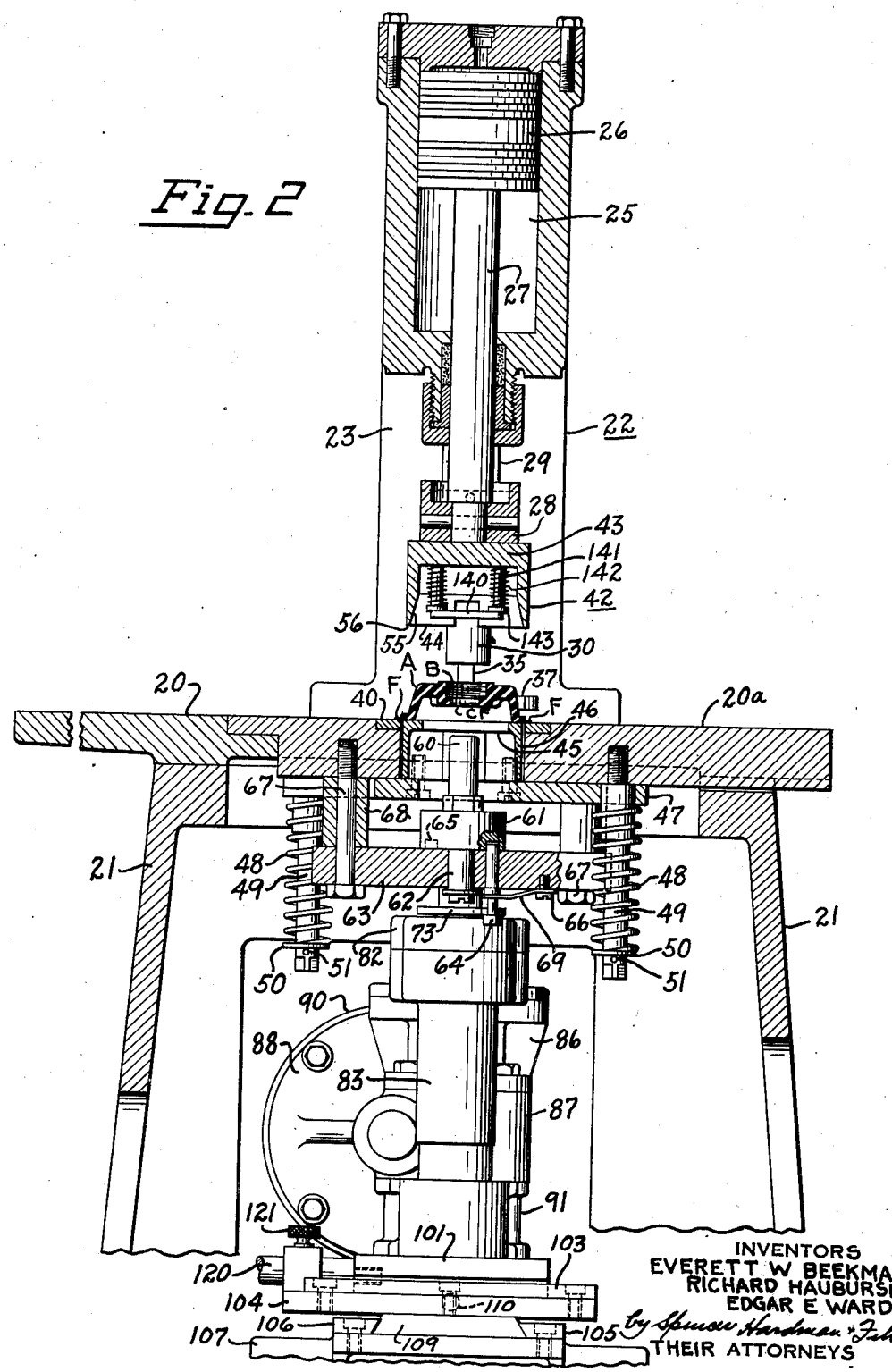

2,171,262

UNITED STATES PATENT OFFICE 2,171,262

TRIMMING AND REAMING MACHINE

Everett W. Beekman and Richard Haubursin, Muncie, Ind., and Edgar E. Ward, Verona, N. J., assignors to General Motors Corporation, Detroit, Mich., a corporation of Delaware Application January 21, 1938, Serial No. 186,108

28 Claims. (Cl. 29—33)

This invention relates to the manufacture of articles from plastic materials such as rubber and more particularly to the manufacture of rubber covers for storage battery cells of the automotive type.

It is one of the objects of the present invention to provide a machine for trimming the flash from the edges of a body molded from rubber or other plastic material.

A further object is to provide for removal of flash from within a hole or recess molded in the body.

Another object is to provide for machining metallic inserts molded in the body.

As applied to the manufacture of molded covers for storage battery cells, it is particularly an object of the present invention to provide a machine which will concurrently trim the flash from the edges of the cover, punch out the flash from within a hole or recess molded in the cover, and ream metallic bushing molded in the cover for the purpose of adapting them to the terminal posts which make electrical connection with the positive and negative plates of the battery.

Further objects and advantages of the present invention will be apparent from the following description, reference being had to the accompanying drawings wherein a preferred embodiment of the present invention is clearly shown.

In the drawings:

Fig. 1 is a fragmentary longitudinal sectional view of a machine embodying the present invention.

Fig. 2 is a fragmentary longitudinal sectional view taken on the section line 2—2 of Fig. 1.

Fig. 3 is a fragmentary sectional view of a portion of Fig. 1, but showing operating parts in other positions.

Fig. 4 is a fragmentary plan view of a table for supporting work pieces such as storage battery cell covers, certain parts being shown in section, this section being taken on the line 4—4 of Fig. 1.

Fig. 5 is a detail side elevation of one of the battery covering bushing reamer units, certain parts being shown in vertical section.

Fig. 6 is a sectional view on the line 6—6 of Fig. 5.

Fig. 7 is a sectional view on the line 7—7 of Fig. 5.

Fig. 8 is a sectional view on the line 8—8 of Fig. 5.

Referring to the drawings, the machine comprises a table 20 having a detachable section 20a, a fragment of the plan view of which is shown in Fig. 4. Table 20 is supported from the floor by legs 21 and it supports a yoke-like frame 22 having posts 23 and 24 by which a cylinder 25 is supported above the table 20. Cylinder 25 receives a piston 26 connected by rod 27 with a plate 28 carrying bushings 29 which slide upon pilot rods 30 depending from the yoke 22.

The table 20 receives the work piece such as storage battery cell covers A which are placed upon the table by an operator who moves them manually under the plate 28 and into such position that they may be operated upon by the machine.

The machine provides a preliminary locating device comprising T-shaped slide bars 31 shown best in Fig. 4. The stems of the T bars 31 are guided for horizontal movement by blocks 32 carried by posts 23 and 24. The T bars 31 are urged toward the center of the machine by springs 33 and against oblique camming surfaces 34 provided by cam bars 35 depending from the plate 28. The head portions 36 of the T bars 31 engage upon the end surfaces of the work piece A. The head portions 36 are provided with hooks or stop lugs 37 which engage upon a side surface of the work piece A to limit the manual movement of the work piece A in a direction away from the operator, or upwardly as viewed in Fig. 4. The head portions 36 of the T bars 31 are provided with oblique or tapered surfaces 38 either of which may be engaged by an entering corner of the work piece A as it is slid by the operator into the space between the head portions 36 of the T bars 31. Figs. 1, 2 and 4, show the work piece A held in position by the preliminary locating, T shaped bars 31. The work piece A is now in position to be operated upon by means for trimming the flash from its outer edges.

The flash trimming means comprises a rectangular die plate 40 of hard metal attached to the table section or plate 20a. The plates 40 and 20a are provided with aligned rectangular openings which conform with the peripheral flange F of the work piece A. The flange F to be trimmed off extends over the edges of the rectangular opening in the die 40. The edges of die 40 provide in effect a shear member which cooperates with a movable shear member or punch 42 which is in the form of an inverted box-like structure having a base plate 43 attached by screws 41 to the plate 28 and having depending flanges 44 which cooperate with the inside edges of the die 40 to shear the flash from the work piece A, as it is moved into the rectangular opening provided in the die 40.

As the work piece A moves into the die 40, it is supported upon a platform 45 having flanges 46 which rest upon a plate 47 which is yieldingly held by springs 48 against the bottom of the table 20a, as shown best in Fig. 2. The springs 48 surround studs 49 and bear downwardly against washers 50 retained on said studs 49 by cross pins 51. Platform 45 is yieldingly maintained normally flush with the table section 20a.

The shearing member or punch 42 provides also a means for maintaining the work piece A in proper location. It will be noted that the work piece A has inclined side edges. Hence, the flanges 44 of the punch 42 are provided internally with tapered surfaces 55 which are shaped so as to conform to the tapered side surfaces of the work piece or storage battery cover A. The bottom surface 56 of the flanges 44 of the shearing member 42 engages upon the upper surface of the edge flange of the work piece A. Thus the work piece A is clamped between the shear punch 42 and the platform 45 while the work piece A is being operated upon.

Before the punch 42 can perform its function to retain the work piece A in proper location the T shaped locating bars 31 must be retracted from the path of movement of the flange 44 of the punch 42. The retraction of the T bars 31 is accomplished during downward movement of the plate 28 by reason of the engagement of the camming surface 34 of the cam bars 35 with the stems of the T bars 31. The T bars 31 are separated from the work piece A in advance of movement of the flange 44 of the punch 42 into engagement with the work piece A.

Upon continuing the downward movement of the plate 28 into the position shown in Fig. 3, it will be noted that the shearing punch 42 has guided and pushed the work piece A through the rectangular opening of the shearing die 40, thus shearing off the flash F as shown in Fig. 2.

During the downward movement of the work piece A from the position shown in Fig. 1 to that shown in Fig. 3, the center flash CF which blocks off a central hole B in the work piece A is broken out by a punch 60 which is mounted eccentrically upon a rotatable block 61. The block 61 provides concentric therewith, a shank 62 which is journaled in a bearing 63 supported by the table 20a of the machine. The block 61 is held in various positions of adjustment, as shown in Fig. 2, by a pin 64, the upper end of which is received by one of several recesses 65 provided in the block 61. The pin 64 is urged upwardly into one of these recesses by leaf spring 69 secured to the bearing member 63 by screw 66. Bearing member 63 is attached by screws 67 to the table 20a there being spacing members 68 interposed between the bearing supports 63 and the under surface of the table 20a.

During downward movement of the work piece A from the position shown in Fig. 1 to that shown in Fig. 3, metallic inserts or bushings D which have been molded in the work piece A are operated upon by reaming tools 70. Each of the reaming tools 70 has a rotating cutter operated by mechanism which can best be described with reference to Figs. 5 to 8 inclusive. The cutter 70 is attached to a vertical rod 71 having a screw threaded portion 72 which screws into the lower end of a tubular shaft 73, and rotatably positioned between the ball thrust bearing 80 and plain bearing 81 by a collar 77 and pin 78. For purpose of adjusting the cutter 70 to the work piece, the rod 71 is turned with respect to the shaft 73 by a disc 74 attached by a pin 75 to the rod 71. By turning the rod 71, the cutter 70 is adjusted vertically with respect to the shaft 73; and it is held in the desired position of adjustment by a lock nut 76. Shaft 73 rotates in the ball thrust bearing 80 and in the plain bearing 81 supported respectively by frame members 82 and 83. Frame member 82 forms a cover for a gear casing provided by a flat wall 84 extending from the member 83 and by a flange 85 integral with the wall 84. The wall member 84 is attached to a frame member 86 which is bolted to a gear casing 87 extending from an end housing 88 of a motor 90 having also an end housing 89. The gear housing 87 is supported by a frame member 91 which supports also the member 83. The gear casing members 82 and 84 provide respectively plain bearing 92 and 94 for a shaft 95 which is journaled also in a roller bearing 96 carried by the frame member 91. The motor 90 drives the shaft 95 through a train of gears located within the gear housing member 87. The shaft 95 carries a gear 97 which meshes with an idle or intermediate gear 98 which meshes with a gear 99 connected with the shaft 73. The idle gear 98 is journaled upon a stub shaft 100.

The frame member 91 which supports the motor 90 and the rotating tool 70 and all of the mechanism connecting the motor with said tool is supported by a slide 101 guided by ways 102 and 103 provided by a slide 104 which is guided for sliding movement at right angles to the direction of movement of the slide 101. Slide 109 is guided by ways 105 and 106 which are secured to a platform 107 attached by screws 108 to a table leg 21.

As shown in Fig. 1, the machine is provided with two reaming units which have been described. Each of these reaming units may be located in various positions in order to accommodate the machine to work pieces A having the inserts D variously located. The slide 109 is moved by a handle rod 110 in a horizontal direction as viewed in Fig. 7 and may be secured in one of several positions of adjustment by a pin 111 which passes through a plane hole 112 in a lug 113 integral with the platform 107, as shown in Fig. 8, and through a tapered hole 114 provided in the slide rod 110. The slide 101 is similarly operated by a handle rod 120 which is secured in one of several positions of adjustment by a pin 121 constructed similarly to pin 111 shown in Fig. 8.

The downward movement of the piston 26 which causes the work piece A to be operated upon is effected by admitting a pressure fluid to a conduit 130 provided in the post 24 of the yoke 22. Upward movement of the piston is accomplished by admitting a pressure fluid to the conduit 131 while the pressure fluid is being discharged through the conduit 130. The admission of pressure fluid to these conduits and the discharge of fluid therefrom is effected by a suitable valve not shown.

When the piston 26 moves upwardly, the work piece A ascends from the position shown in Fig. 3 to that shown in Figs. 1 and 2. However, before the piston 26 has been elevated sufficiently to cause the guiding, T bar members 31 to move from a retracted position to the work piece locating position shown in Fig. 4, it is possible for the operator to move the finished work piece A from its position under the shearing punch 42 and to substitute a new work piece therefor. The operator usually keeps a supply of un-trimmed work pieces A upon the table 20. He arranges these work pieces in side to side relation so that he may push a number of work pieces toward the shearing punch 42. While the shearing punch 42 is still in the down position as shown in Fig. 3, the operator urges an untrimmed work piece against the left hand face of the punch 42 as viewed in Fig. 2. As soon as the punch 42 has been elevated sufficiently above the table 20 to clear an untrimmed work piece A, the trimmed work piece will be pushed by the untrimmed work piece out of alignment with the punch 42 while an untrimmed work piece is being substituted therefor. By the time the untrimmed work piece will have been located under the punch 42, the cam bars 35 will have been lifted sufficiently to permit the locating head portions 36 of the T bars 31 to move into the position shown in Fig. 4 and thus locate an untrimmed work piece in the proper position.

In order to avoid the sticking or clinging of a trimmed work piece A to the punch 42, the punch is provided with knockout bars 140, each of which is supported at its ends by guide rods 141 depending from the base portion 43 of the punch 42. The knockout bars 140 are urged yieldingly downwardly by springs 142 bearing at their lower ends against washers or flanges 143 provided by said rods 141, and, at the upper ends, against the lower surface of the base portion 43 of the punch 42.

While the embodiment of the present invention as herein disclosed, constitutes a preferred form, it is to be understood that other forms might be adopted, all coming within the scope of the claims which follow.

What is claimed is as follows:

1. A machine for finishing molded work pieces comprising, in combination, a table having an opening for receiving a work piece, a resiliently supported platform within said opening for supporting a work piece and spring urged to a position normally flush with the table, means for clamping the work piece against the platform and moving the work piece through said opening and the platform therewith, and a finishing tool for operating upon the work piece as it is clamped and moved through said opening.

2. A machine for finishing molded work pieces comprising, in combination, a table having an opening for clamping the work piece against the platform and receiving a work piece, a resiliently supported platform within said opening for supporting a work piece and spring urged to a position normally flush with the table, means for moving the work piece through said opening and the platform therewith, a punch engageable with flash within a recess of the work piece as it is clamped and moved through said opening.

3. A machine for finishing molded work pieces comprising, in combination, a table having an opening for receiving a work piece, a resiliently supported platform within said opening for supporting a work piece and spring urged to a position normally flush with the table, means for moving the work piece through said opening and the platform therewith, and a rotary reamer engageable with inserts in the work piece as it is moved through said opening.

4. A machine for finishing molded work pieces comprising, in combination, a table having an opening for receiving a work piece, a resiliently supported platform within said opening for supporting a work piece and spring urged to a position normally flush with the table, means for moving the work piece through said opening and the platform therewith, a punch engageable with flash within a recess of the work piece as it is moved through said opening, and a rotary reamer engageable with inserts in the work piece as it is moved through said opening.

5. A machine for finishing molded work pieces comprising, in combination, a table providing a die having an opening for receiving a work piece and conforming to the periphery thereof, a resiliently supported platform within said die opening for supporting a work piece and spring urged to a position normally flush with the table, a punch engageable with the work piece to move the same through said die opening and the platform therewith whereby flash is removed from the edge of the work piece, and another finishing tool for operating upon the work piece as it is moved through said opening.

6. A machine for finishing molded work pieces comprising, in combination, a table providing a die having an opening for receiving a work piece and conforming to the periphery thereof, a resiliently supported platform within said die opening for supporting a work piece and spring urged to a position normally flush with the table, a punch engageable with the work piece to move the same through said die opening and the platform therewith whereby flash is removed from the edge of the work piece, a punch engageable with flash within a recess of the work piece as it is moved through said opening.

7. A machine for finishing molded work pieces comprising, in combination, a table providing a die having an opening for receiving a work piece and conforming to the periphery thereof, a resiliently supported platform within said die opening for supporting a work piece and spring urged to a position normally flush with the table, a punch engageable with the work piece to move the same through said die opening and the platform therewith whereby flash is removed from the edge of the work piece, and a rotary reamer engageable with inserts in the work piece as it is moved through said opening.

8. A machine for finishing molded work pieces comprising, in combination, a table providing a die having an opening for receiving a work piece and conforming to the periphery thereof, a resiliently supported platform within said die opening for supporting a work piece and spring urged to a position normally flush with the table, a punch engageable with the work piece to move the same through said die opening and the platform therewith whereby flash is removed from the edge of the work piece, a punch engageable with flash within a recess of the work piece as it is moved through said opening, and a rotary reamer engageable with inserts in the work piece as it is moved through said opening.

9. A machine for finishing molded work pieces of the type having a peripheral flange, means for clamping a work piece by its flange against a movable support and for moving said work piece and support laterally of the plane of the peripheral flange, and a finishing tool for operating upon the work piece as it is clamped and so moved.

10. A machine for finishing molded work pieces of the type having a peripheral flange, means for clamping a work piece by its flange against a movable support and for moving said work piece and support laterally of the plane of the peripheral flange, means for removing the flash from the peripheral flange as the work piece is clamped and so moved.

11. A machine for finishing molded work pieces of the type having a peripheral flange, means for clamping a work piece by its flange against a movable support and for moving said work piece and support laterally of the plane of the peripheral flange, and a punch engageable with flash within a recess of the work piece as it is so moved.

12. A machine for finishing molded work pieces of the type having a peripheral flange, means for clamping a work piece by its flange against a movable support and for moving said work piece and support laterally of the plane of the peripheral flange, and a rotary reamer engageable with inserts in the work piece as it is so moved.

13. A machine for finishing molded work pieces of the type having a peripheral flange, means for clamping a work piece by its flange against a movable support and for moving said work piece and support laterally of the plane of the peripheral flange, means for removing the flash from the peripheral flange as the work piece is so moved, a punch engageable with flash within a recess of the work piece as it is so moved, and a rotary reamer engageable with inserts in the work piece as it is so moved.

14. A machine for finishing molded work pieces comprising, in combination, means for supporting work pieces for feeding movement in a certain direction, means for moving one work piece at a time in a direction transverse to the direction of feed, means for locating a work piece in position preparatory to transverse movement, and a tool operating upon the work piece during said transverse movement.

15. A machine for finishing molded work pieces comprising, in combination, means for supporting work pieces for feeding movement in a certain direction, means for moving one work piece at a time in a direction transverse to the direction of feed, means for guiding a work piece into alignment with the moving means as the work piece is moved along said support, means for stopping the feeding of said work piece when aligned with the moving means, and a tool operating upon the work piece during said transverse movement.

16. A machine for finishing molded work pieces comprising, in combination, means for supporting work pieces for feeding movement in a certain direction, means for moving one work piece at a time in a direction transverse to the direction of feed, work piece locating means engageable with opposite edges of a work piece and having surfaces for camming the work piece into alignment with the moving means and having provisions for stopping the feeding of the work piece when aligned with the moving means, and a tool operating upon the work piece during said transverse movement.

17. A machine for finishing molded work pieces comprising, in combination, means for supporting work pieces for feeding movement in a certain direction, means for moving one work piece at a time in a direction transverse to the direction of feed, means for locating a work piece in position preparatory to transverse movement, means for withdrawing the locating means during operation of said moving means, and a tool operating upon the work piece during said transverse movement.

18. A machine for finishing molded work pieces comprising, in combination, means for supporting work pieces for feeding movement in a certain direction, means for moving one work piece at a time in a direction transverse to the direction of feed, means for locating a work piece in position preparatory to transverse movement, said moving means having provisions cooperating with the work piece to maintain its location, means for withdrawing the locating means during operation of said moving means, and a tool operating upon the work piece during said transverse movement.

19. A machine for trimming the flash from the edge of a molded work piece comprising, in combination, a table providing a die conforming to the periphery of the work piece, means for guiding a work piece moved upon the table into alignment with the die and for stopping the feeding of the work piece when it is so aligned, a punch for moving the work piece through the die, and means for moving the punch and for retracting the work piece locating means.

20. A machine for trimming the flash from the edge of a molded work piece comprising, in combination, a table providing a die conforming to the periphery of the work piece, means for guiding a work piece moved upon the table into alignment with the die and for stopping the feeding of the work piece when it is so aligned, a punch for moving the work piece through the die, said punch having provisions cooperating with the work piece for maintaining it in location, and means for moving the punch and for retracting the work piece locating means.

21. A machine for finishing molded work pieces of the type having a peripheral flange, means for clamping a work piece against a movable support and for moving said work piece and support laterally of the plane of the peripheral flange, and a punch engageable with flash within a recess of the work piece as it is so moved.

22. A machine for finishing molded work pieces of the type having a peripheral flange, means for clamping a work piece against a movable support and for moving said work piece and support laterally of the plane of the peripheral flange, and a rotary reamer engageable with inserts in the work piece as it is so moved.

23. A machine for finishing molded work pieces of the type having a peripheral flange, means for clamping a work piece against a movable support and for moving said work piece and support laterally of the plane of the peripheral flange, means for removing the flash from the peripheral flange as the work piece is so moved, a punch engageable with flash within a recess of the work piece as it is so moved, and a rotary reamer engageable within the work piece as it is so moved.

24. A machine for finishing molded work pieces having a recess comprising in combination, a stationary punch, a yieldable support, means for simultaneously clamping the work piece to the support so that the recess will be in alignment with the punch and moving the work piece over the punch whereby flash within the recess will be removed.

25. A machine for finishing molded work pieces having a recess and a plurality of inserts, a stationary punch, a plurality of rotary members, a yieldable support, means for simultaneously clamping the work piece to the support so that the recess and inserts respectively will be in alignment with the punch and the rotary members, and said means moving the work piece a certain distance over the punch and rotary members whereby flash within the recess and inserts will be removed.

26. A machine for finishing molded work pieces of the type having flash thereon, a table having an opening, a support movable within the opening, means for simultaneously clamping a work piece against the movable support and moving the work piece and support through the opening whereby flash is removed from the work piece, and a finishing tool for operating upon the work while it is clamped against the support and moved within the opening.

27. A machine for finishing molded work pieces having flash thereon, comprising, a table having an opening, a support movable within the opening, means for locating a work piece in the desired position over the opening, means for clamping the work piece against the movable support and for moving the work piece and the support through the opening whereby external flash is removed from the work piece, means for retracting the locating means prior to the clamping of the work piece, and means for removing internal flash from the work piece during movement thereof within said opening.

28. A machine for finishing molded work pieces having a peripheral flange comprising in combination, a table providing a die having an opening for receiving a work piece and conforming to the periphery thereof, a platform resiliently supported within the die opening and normally flushed with the table, means for locating a work piece in a definite position on the table; movable means for clamping the work piece by its flange against the platform and for moving the work piece and the platform therewith through the opening whereby flash is removed from the periphery of the work piece, means movable with the clamping means for retracting the locating means prior to the clamping of the work piece, a punch for severing flash within a recess of the work piece as it is moved through the opening; and rotary means engageable with inserts in the work piece as it is moved through the opening.

EVERETT W. BEEKMAN.
RICHARD HAUBURSIN.
EDGAR E. WARD.